(12) United States Patent
Zhu et al.

(10) Patent No.: US 10,656,919 B2
(45) Date of Patent: May 19, 2020

(54) MATCHING PROGRAMMING VARIABLES ACROSS DIFFERENT DATA DOMAINS

(71) Applicant: PAYPAL, INC., San Jose, CA (US)

(72) Inventors: Guansheng Zhu, Shanghai (CN); Weijia Deng, Shanghai (CN); Shuan Yang, Shanghai (CN); Feng Chen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 44 days.

(21) Appl. No.: 15/333,816

(22) Filed: Oct. 25, 2016

(65) Prior Publication Data

US 2018/0113681 A1  Apr. 26, 2018

(51) Int. Cl.
*G06F 8/30* (2018.01)
*G06F 8/71* (2018.01)
*G06F 16/33* (2019.01)
*G06F 8/20* (2018.01)

(52) U.S. Cl.
CPC .................. *G06F 8/31* (2013.01); *G06F 8/20* (2013.01); *G06F 8/71* (2013.01); *G06F 16/334* (2019.01)

(58) Field of Classification Search
CPC ......... G06F 8/31; G06F 8/71; G06F 17/30675
USPC ........................................................ 717/114
See application file for complete search history.

(56) References Cited

U.S. PATENT DOCUMENTS

| | | | | |
|---|---|---|---|---|
| 6,418,448 B1* | 7/2002 | Sarkar | ............... | G06F 17/30893 |
| 6,460,043 B1* | 10/2002 | Tabbara | ............. | G06F 17/30392 |
| 8,359,341 B2* | 1/2013 | Chen | .................... | G06Q 10/107 |
| | | | | 707/822 |
| 9,824,128 B1* | 11/2017 | Maluf | ............... | G06F 17/30554 |
| 2008/0154948 A1* | 6/2008 | Stegmann | ............. | G06F 9/4435 |
| 2009/0006463 A1* | 1/2009 | Mehra | ............... | G06F 17/30557 |
| 2010/0299327 A1* | 11/2010 | Kiefer | ............... | G06F 17/30917 |
| | | | | 707/736 |
| 2012/0239612 A1* | 9/2012 | George | ............. | G06F 17/30563 |
| | | | | 707/602 |

(Continued)

OTHER PUBLICATIONS

Oracle, Create Function Statement, Internet Archive (Nov. 28, 2013) retrieved from https://web.archive.org/web/20131128075202/https://docs.oracle.com/javadb/10.8.3.0/ref/rrefcreatefunctionstatement.html on Jan. 6, 2018.*

(Continued)

*Primary Examiner* — Lewis A Bullock, Jr.
*Assistant Examiner* — Theodore E Hebert
(74) *Attorney, Agent, or Firm* — Haynes and Boone, LLP

(57) ABSTRACT

Systems and methods for matching data variables across different data domains are disclosed. An example method includes: identifying a first data parameter included in a first programming statement; selecting a mapping file that includes one or more mappings between parameters associated with in a first type of programming language and parameters associated with in a second type of programming language. The second type of programming language is different form the first type of programming language. The example method further includes identifying, based on the one or more mappings, second one or more data parameters associated with a second programming statement; receiving a user section of the first data parameter; and responsive to the user section, presenting the second one or more data parameters to a user.

20 Claims, 6 Drawing Sheets

(56) References Cited

U.S. PATENT DOCUMENTS

| | | | | |
|---|---|---|---|---|
| 2012/0330878 A1* | 12/2012 | Vickers | ............ | G06F 17/30595 |
| | | | | 706/50 |
| 2013/0054630 A1* | 2/2013 | Briggs | ............. | G06F 17/30389 |
| | | | | 707/760 |
| 2013/0262510 A1* | 10/2013 | Smith | .............. | G06F 17/30283 |
| | | | | 707/770 |
| 2015/0227362 A1* | 8/2015 | Dvinsky | ................... | G06F 8/70 |
| | | | | 717/120 |
| 2015/0363494 A1* | 12/2015 | Norman | ............ | G06F 17/30864 |
| | | | | 707/769 |

OTHER PUBLICATIONS

Derby, Argument Matching, Apache (Sep. 26, 2015) retrieved from https://web.archive.org/web/20150926013512/https://db.apache.org/derby/docs/10.6/ref/rrefsqljargmatching.html on Jan. 6, 2018.*

Dan Vega, Creating Apache Derby Custom Functions: Part 2, The Real Dan Vega (Published Feb. 17, 2010) retrieved from http://therealdanvega.com/blog/2010/02/17/creating-apache-derby-custom-functions-part-2 on Jan. 6, 2018.*

Yan, How Does Database Indexing Work?, stackoverflow (Published Sep. 8, 2015) retrieved from https://web.archive.org/web/20150908082558/https://stackoverflow.com/questions/1108/how-does-database-indexing-work on Aug. 15, 2018.*

* cited by examiner

MATCHING PROGRAMMING VARIABLES ACROSS DIFFERENT DATA DOMAINS

TECHNICAL FIELD

The present disclosure relates generally to computer programming languages, and in particular, to matching data variables across different data domains.

BACKGROUND

Data analysts and engineers often work on different data domains with different programming languages, but collaborate to produce the correct data correlations. For example, data analysts often use Sequential Query Languages (SQLs) to search databases, while software engineers usually use Object Oriented Programming (OOP) languages to process data.

To enable data processing across different domains, data analysts and engineers sometimes rely on ad hoc non-technical verbal communications to determine how data in the data analysts' data domain/programming language should be mapped to those in the engineers' data domain/programming language. This is not only inefficient, but also error-prone.

There is therefore a need for a device, system, and method, which automatically match data variables across different data domains.

Figure 1:
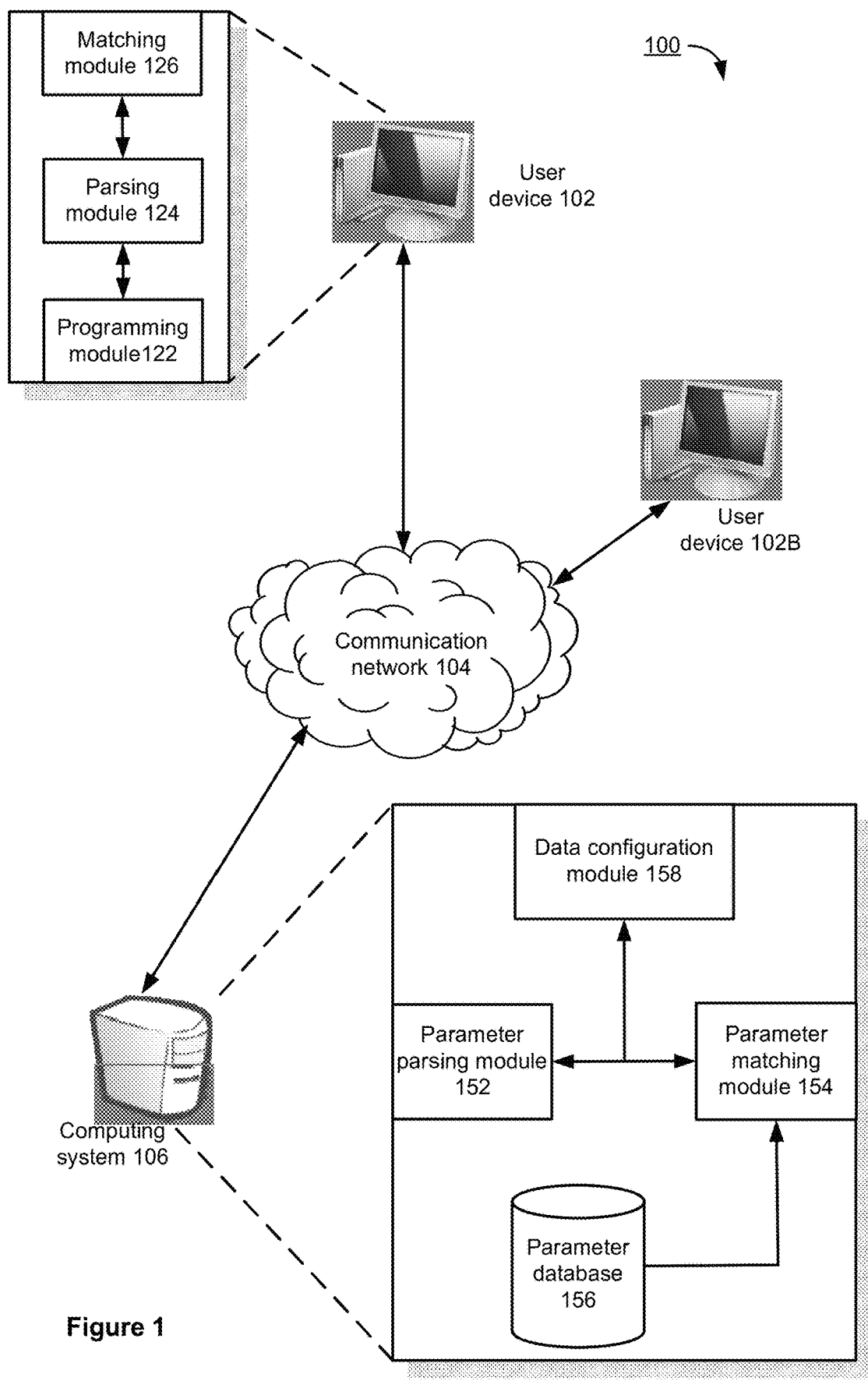
FIG. 1 is a schematic view illustrating an embodiment of a system for matching data variables across different data domains.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for matching data variables across different data domains.

In some implementations, a data configuration interface between a data analyst's data domain (generally a first data domain) and a software engineer's data domain (generally a second data domain)—as well as between the programming variables used by the data analyst and by the software engineer may be provided. Data variables used by the data analyst and the software engineer (e.g., SQL variables and JAVA variables, respectively) can be mapped to parameters provided in the configuration interface.

The mappings may be created automatically by parsing the programming statements provided by a data analyst and a software engineer, for example, a SQL program and a JAVA program, respectively. The automatic parsing process can increase mapping efficiency. The mappings may also be created manually by the users (e.g., data analysts and software engineers) to provide greater flexibility. For example, after performing a first keyword search on a SQL program and a second keyword search on a JAVA program, the data configuration interface may determine that (1) the data column "Country" in a data table used by the data analyst and (2) the output parameter "Region" in a JAVA program used by the software engineer may be both mapped to the "Jurisdiction" parameter provided in the data configuration interface.

In some implementations, a many-to-one mapping may be provided. For example, two or more data variables from a same data domain may be mapped to a single parameter in the configuration interface. For example, the total values of the variable "USA_sales" and the variable "Canada_sales" may correspond to the value of the "North America_sales" parameter provided in a data configuration interface.

The systems and methods described in the present disclosure can provide a variety of technical advantages.

First, ad hoc non-technical communications between users working on different data domains (e.g., data analysts and software engineers) can be replaced by systematic and definitive programming statements that are less error-prone and more maintainable.

Second, software programs can be automatically parsed to identify matching data variables across different data domains, without requiring user effort.

Third, the many-to-one mapping feature enables parameter mapping where direct one-to-one mappings (e.g., a single data domain variable-to-a single configuration parameter) are not feasible or possible. For example, only the combination of the sales in the "United States" (a first data variable) and the sales in "Canada" (a second data variable) would correspond to the sales in "North America" (a configuration interface parameter). Without these mapping methods (e.g., many-to-one), the configuration interface would need to include a much larger number of input variables, rendering it much harder to work with or to maintain.

Additional details of implementations are now described in relation to the Figures.

FIG. 1 is a schematic view illustrating an embodiment of a system 100 for matching data variables across different data domains. The system 100 may comprise or implement a plurality of servers and/or software components that operate to perform various technologies provided in the present disclosure.

As illustrated in FIG. 1, the system 100 may include one or more user devices 102 (e.g., the user device 102 and the user device 102B), and a computing system 106, in communication over a communication network 104. In the present disclosure, a user device may be, but is not limited to, a mobile payment device, a smartphone, a laptop computer, a notebook computer, a mobile computing device, or a desktop computer.

In one embodiment, the user device 102 hosts an Integrated Development Environment (IDE) that provides one or more functionalities to a user (e.g., a data analyst or a software programmer) for software development, code review or debugging. The IDE may include one or more functional modules, for example, a source code editor, a build automation tool, and a debugger, as well as Graphical User Interfaces (GUIs) associated therewith. The IDE may, through one or more GUIs, enable a user to process (e.g., draft, review, and modify) programming statements within various functional modules of the IDE.

The IDE may provide an intelligent code completion feature, which suggests programming statements or data parameters based on a portion of a user provided programming statement or data parameter. For example, if a user is entering the string "Nor," the intelligent code completion feature may determine that the user is trying to enter the data parameter "North_America_sale," and display the string "North_America_sale."

The IDE may provide a data parameter (e.g., a constant or a variable) identification feature, which presents, to a user, the relationship between a user selected data parameter and a different data parameter. For example, when a user selects a JAVA variable "United States" in a JAVA source code editor, the IDE may present a tooltip including the phrase "The 'US' column is the corresponding SQL parameter."

The IDE may also include contain a compiler, interpreter, or both. The IDE may also provide a version control system, a Graphical User Interface (GUI). Some IDEs may also provide a class browser, an object browser, and a class hierarchy diagram, for use in object-oriented software development. The IDE may be one of a NetBeans IDE, an Eclipse IDE, a SharpDevelop IDE, or a Lazarus IDE.

In one embodiment, the user device 102 includes a programming module 122, a parsing module 124, and a matching module 126.

The programming module 122, in one embodiment, enables a user to provide one or more programming statements, e.g., object oriented programming statements (e.g., JAVA and C++ statements), scripting programming statements (e.g., PERL statements, VBSCRIPT statements, and JAVA SCRIPT statements), SQL statements (e.g., MYSQL statements and MS SQL statements). The programming module 122 enables a user to add, modify, and delete user-provided programming statements.

The parsing module 124 may parse programming statements based on a set of parsing rules, e.g., user-provided parsing rules or system-defined parsing rules. The parsing rules may include a syntax-based parsing rule, a semantics-based rule, or both.

For example, based on a user-specified syntax-based parsing rule that variables included in an assignment statement need to be parsed and recognized as separate parameters, but that constants included the assignment statement are not considered as parameters, the parsing module 124 may recognize the assignment statement (A=B+C+1.3) as including the following three parameter "A," "B," and "C," but would not recognize the constant "1.3" as a data parameter.

For another example, based on a system-defined parsing rule that variables (e.g., data parameters whose values may change), but not constants (data parameters whose values may not change, e.g., "90%"), need to be parsed into individual parameters, the parsing module 124 may recognize, from the programming statement "North_America_total_sales=US_total_sales+Canada_total_sales*90%," the following three data parameters "North_America_total_sales," "US_total_sales," and "Canada_total_sales." Here, the parsing module 124 does not recognize the constant "90%" as a data parameter.

As another example, based on a system-specified semantics-based parsing rule that variables included in the primary branch (e.g., the first "IF" branch) of a set of conditional statement need to be parsed and recognized as separate parameters, but that the secondary branches (e.g., all "else" branches) of the set of conditional statement need not to be parsed and parameters recognized therefrom, the parsing module 124 may recognize the following conditional statement:

IF $A>B+C$ THEN $D=B*C$

ELSE IF $E>10$ THEN $F++$;

ELSE $F--$ as including the following parameters "A," "B," "C," and "D," because these variables are included in the primary conditional branch. In this example, the parsing module 124 does not recognize the variables "E" and "F" as parameters, because these variables are included in the secondary conditional branches.

The matching module 126, in one embodiment, matches parameters from different programming statements (e.g., statements A and B), different source code files (e.g., files A and B), different data domains (e.g., federal appellate jurisdictions and the names of the States in the United States), and/or different programming languages (e.g., SQL and JAVA). The matching module 126 may match data parameters in accordance with syntax-based rules, semantics-based rules, or both.

In one embodiment, the matching module 126 may match data parameters in accordance with syntax-based rules. The matching module 126 may match data parameters based on whether selected data parameters follow a certain naming convention. For example, because both of the JAVA variables "US_sales" and "CA_sales" both include the phrase "_sales" after a capitalized two-character country code (e.g., "US" and "CA," respectively), the matching module 126 may deem the mathematical total of these JAVA variables as matching the "NA_sales" (which stands for NorthAmerica_sales) column in the "Global_sales" table.

The matching module 126 may also match data parameters based on whether selected data parameters include a certain keyword or key phrase. For example, because the C++ variable "Total_sales" and the column name "Total-SALES" both include the words "total" and "sales," the matching module 126 may deem that the C++ variable "Total_sales" and the column name "Total-SALES" match each other.

In another embodiment, the matching module 126 may match data parameters in accordance with sematic-based rules. For example, because the continent of the North America includes both the United States of America and Canada, the matching module 126 may determine that the mathematical total of the JAVA variables "US_sales" and "Canada_sales" matching the "NorthAmerica_SALES" column in the "Global_sales" table.

As another example, the matching module 126 may determine the mathematical total of the columns in the "Monday, "Tuesday," "Wednesday," "Thursday," and "Friday" in the "Sales_data" table as matching the value of "Weekly_sale" property of the "Store_A" object minus the value of "Weekend_sale" property of the "Store_A" object, in a C++ programming statement.

In one embodiment, the communication network 104 interconnects the user devices 102 and 102B and the computing system 106. In some implementations, the communication network 104 optionally includes the Internet, one or more local area networks (LANs), one or more wide area networks (WANs), other types of networks, or a combination of such networks.

In one embodiment, the computing system 106 parses different programming statements, different source code files, different data sources, or a combination thereof, to identify data parameters and then match the identified parameters with each other when predefined conditions are met. The computing system 106 may create mappings between the matched parameters and stored the parameters as well as and in association with the mappings in the parameter database 152. In one embodiment, the computing system 106 includes a parameter parsing module 152, a parameter matching module 154, a parameter database 156, and a data configuration module 158.

The parameter parsing module 152, in one embodiment, parses programming statements, source code files, data sources, or a combination thereof and identifies, based on one or more parsing rules, data parameters. For example, the parsing module 124 may recognize the assignment statement (A=B+C+1.3) as including the following three parameters "A," "B," and "C."

The parameter matching module 154, in one embodiment, matches data parameters recognized from different programming languages or data domains with other each when certain conditions are met. For example, the matching module 126 may determine that the mathematical total of the JAVA variables "US_sales" and "Canada_sales" matches the "North America_SALES" column in the "Global_sales" table.

The parameter database 156, in one embodiment, stores parameters recognized from different programming languages or data domains and the mapping relationship between these stored parameters. For example, the parameter database 156 may store the total values of the variables "US_sales" and "Canada_sales" as matching the "North America_SALES" column in the "Global_sales" table.

The data configuration module 158, in one embodiment, accesses the parameters and parameter mappings stored in the parameter database 156 and presents the mapping relationship to a user. For example, when a user selects, in an IDE, one parameter in a parameter matching pair, the data configuration module may display the identifier (e.g., name) of the other parameter in the pair and the relationship between these parameters.

Figure 2A:
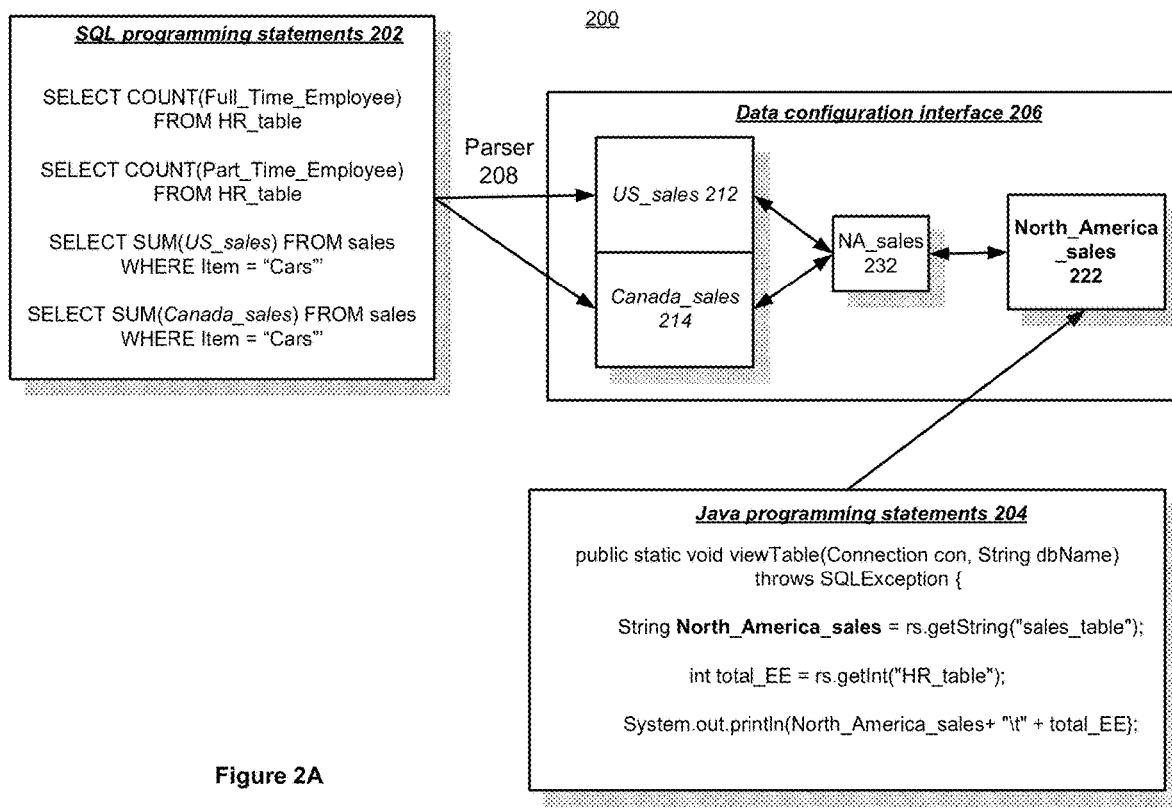
FIG. 2A is a schematic view illustrating an embodiment of a system for matching data variables across different data domains.

FIG. 2A is a schematic view illustrating an embodiment of a system 200 for matching data variables across different data domains. The computing system 100, for example, when programmed in accordance with the technologies described in the present disclosure, can be the system 200.

The system 200 may be part of an IDE, in which user-provided programming statements, such as the SQL programming statements 202, may be presented. As a user is providing (e.g., adding, deleting, or modifying) a SQL programming statement (e.g., "SELECT COUNT(Full_Time_Employee) FROM HR_table," a data parameter parser may monitor the user input and continuously parse the SQL programming statements 202 (or a particular portion thereof, e.g., newly added portions of the SQL statements 202).

For example, as a user is completing, e.g., word-by-word, the SQL statement "SELECT COUNT(Full_Time_Employee) FROM HR_table," the parser 208 may, based on one or more parsing rules, identify data parameters as they appear. For example, when the user is typing the word "SELECT," the parser 208 determines that the word "SELECT" matches the name of a system-defined SQL function, rather than that of a user-provided data parameter (e.g., a variable), and thus does not attempt to find a matching parameter, e.g., from the data configuration interview 206, for the word "SELECT." A similar process may take place as the user is entering the word "COUNT," which is also a system-defined SQL function.

When the user is entering the phrase "Full_Time_Employee," however, the parser 208 determines that the phrase "Full_Time_Employee" is not among the system-defined SQL keywords or functions. Based on this determination, the parser 208 identifies the phrase "Full_Time_Employee" as a user-provided data parameter.

In accordance with identifying the phrase "Full_Time_Employee" as a user-provided data parameter, the parser 208 then searches the data configuration interface 206 to identify whether a parameter in the JAVA programming statements 204 matches the parameter "Full_Time_Employee."

As shown in the data configuration interface 206, none of the mappings identifies the parameter "Full_Time_Employee" in the SQL programming statements 202 as matching any parameters in the Java programming statements 204. As such, the parser 208 returns an empty matching result. Similar processes may take place as (1) the user is entering the phrase "HR_table" and as (2) the user is entering the programming statement "SELECT COUNT (Part_Time_Employee) FROM HR_table" because, as shown in FIG. 2A, none of the mappings stored in the data configuration interface 206 identifies the parameter "HR_table" or the parameter "Part_Time_Employee," respectively, in the SQL programming statements 202 as matching any parameters in the Java programming statements 204.

When the user is entering the phrase "US_sales" as part of providing the programming statement "SELECT SUM (US_sales) FROM sales WHERE Item='Cars,'" however, the parser 208 determines that the phrase "US_sales" is a user-provided data parameter.

In accordance with this determination, the parser 208 searches the data configuration interface 206 to identify whether a parameter in the JAVA programming statements 204 matches the parameter "US_sales." As shown in FIG. 2A, the parameter "US_sales" matches the intermediary parameter "NA_sales" 232, which in turn matches the data variable "North_America_sales 222," as defined in the JAVA programming statements 204.

As shown in FIG. 2A, the mapping 212-232-22 is not a one-to-one mapping; rather, the mapping (212+214)-232-222 is a many-to-one mapping. For example, the parameter "US_sales" does not individually (or directly) match the JAVA variable "North_America_sales 222"; rather, the mathematical total of the parameter "US_sales" and the parameter "Canada_sales" 214 matches the JAVA variable "North_America_sales 222, as defined in the JAVA programming statements 204. The IDE may present information illustrating these determinations as well as matching relationships, e.g., as one or more tool-tips or popup windows, to the user providing the SQL programming statements 202.

Figure 2B:
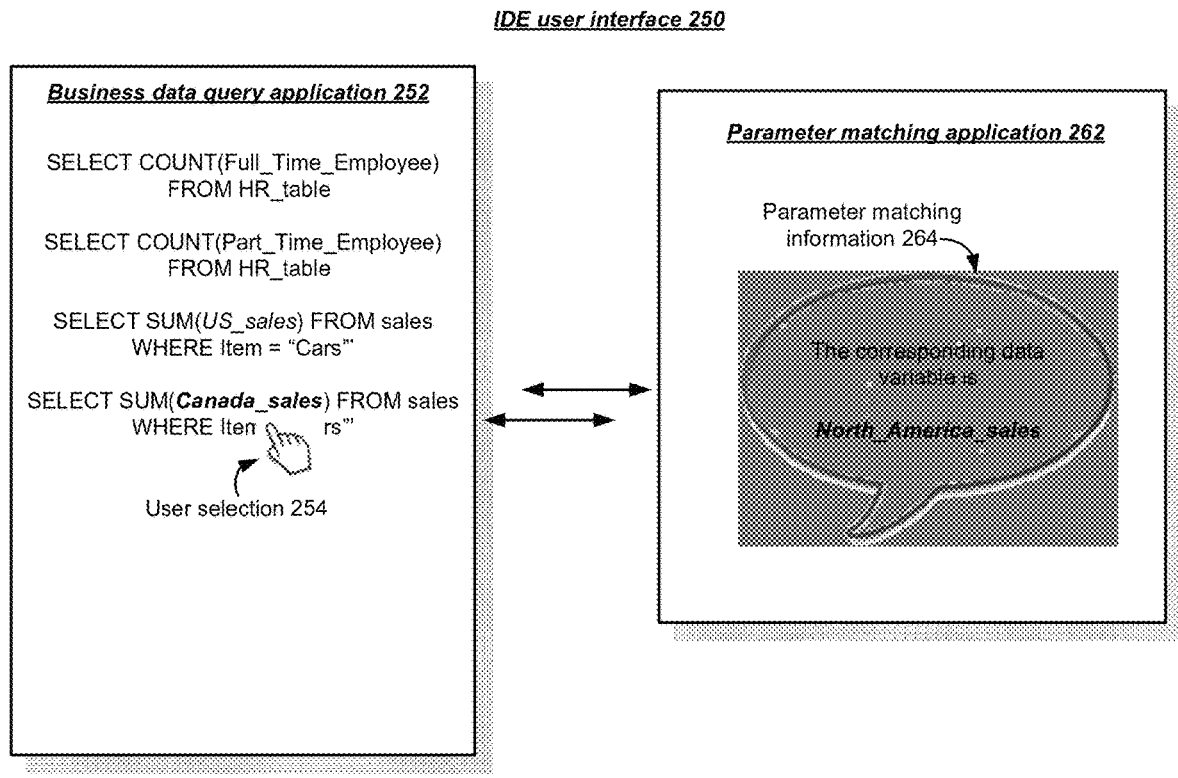
FIG. 2B is a schematic view illustrating an embodiment of a user interface for matching data variables across different data domains.

FIG. 2B is a schematic view illustrating an embodiment of a user interface 250 for matching data variables across different data domains. The user device 102, for example, when programmed in accordance with the technologies described in the present disclosure, can provide the user interface 250.

As shown in FIG. 2B, the IDE user interface 250 may include a business data query application 252, as well as a parameter matching application 262. The business data query application 252, for example, may allow a business analyst to program and execute SQL programming statements; the parameter matching application 262 may provide information identifying which one or more parameters, e.g., from a different data domain, from a different set of programming statements, or from a different source code file, match a user selected data parameter in the business data query application 252.

For example, as shown in FIG. 2B, a user is selecting (254) the phrase "Canada_sales" in the business data query application 252. Responsive to the user selection 254 of the phrase "Canada_sales," the IDE user interface 250 may execute a parameter parsing and matching process, e.g., one that is similar to the process described with reference to FIG. 2A.

As shown in FIG. 2B, the IDE user interface 250 may recognize the phrase "Canada_sales" as a valid data parameter and finds a matching data parameter—the "North_America_sales" column as defined in the JAVA programming statements 204. As such, the parameter matching application 262 may present parameter matching information 264, e.g., by way of a toolbar tip, to the user in the IDE user interface 250. Note that, in some implementations, the parameter matching information 264 may be presented concurrently with the user-selected parameters "Canada_sales," within the IDE user interface 250.

In the event that a user-selected data parameter in the business data query application 252 is not matched to any existing data parameters, e.g., the user-selected data parameter is appearing for the first time in the programming statements in the business data query application 252, the parameter matching application 262 may enable a user to manually specify a mapping relationship. For example, upon a user selection of the parameter "Cars" and a determination that the parameter "Cars" has not been mapped to any parameter in the JAVA programming statements 204, the parameter matching information 264 may present a pop-up window to prompt the user manually define such as mapping.

In some implementation, the business data query application 252 may, for example, upon a user exiting the business data query application 252 or performing a source code spell check, perform one or more iterations of parameter parsing and matching and prompt the user to manually define one or more mappings for parameters (for which there is no existing mapping).

Figure 3:
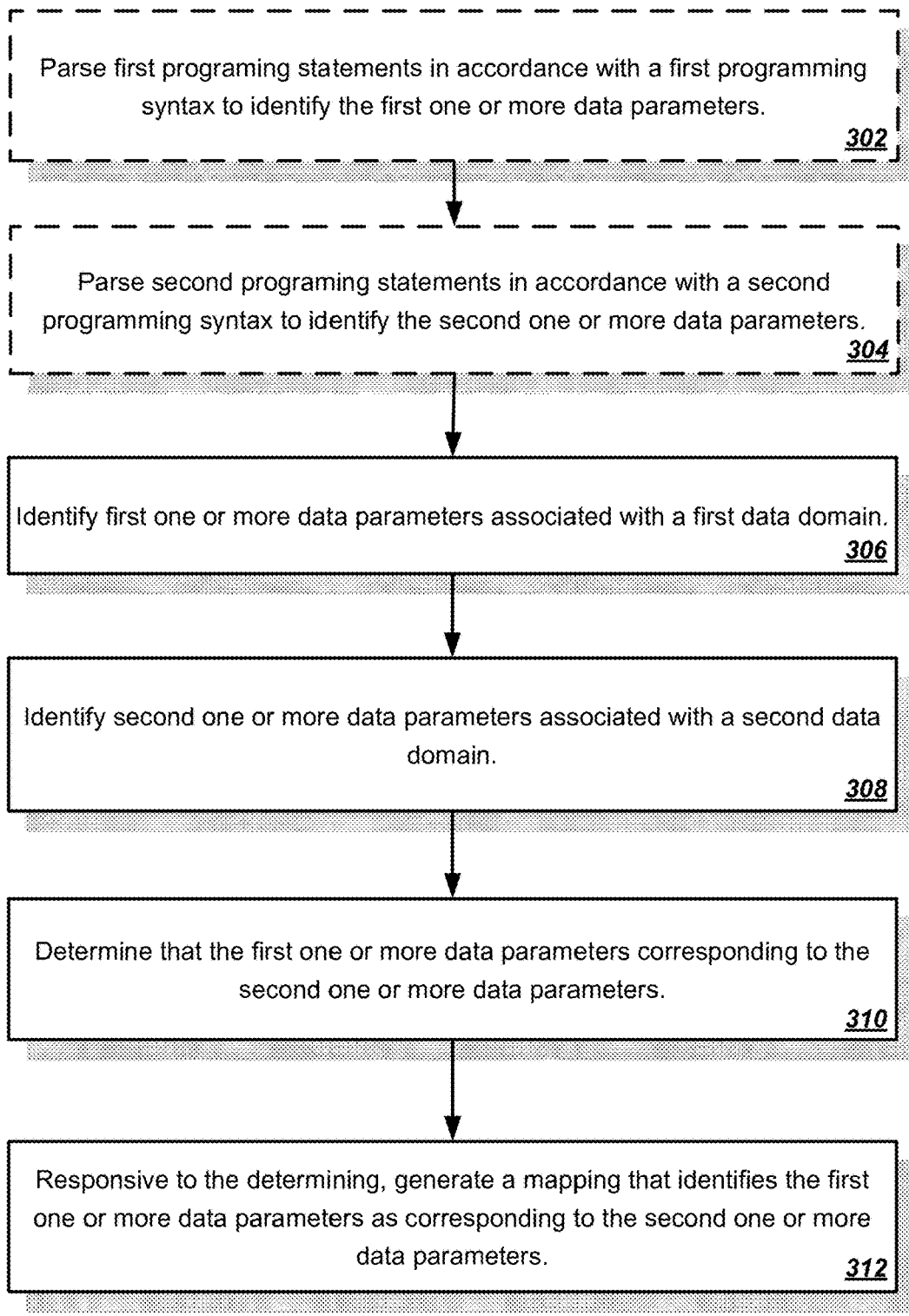
FIG. 3 is a flow chart illustrating an embodiment of a method for matching data variables across different data domains.

FIG. 3 is a flow chart illustrating an embodiment of a method 300 for matching data variables across different data domains. The computing system 106, for example, when programmed in accordance with the technologies described in the present disclosure, can perform the method 300.

In some implementations, an offline code parsing features is provided. For example, source code of several computer programs may be scanned or parsed, in parallel or in sequence, based on parsing rules to identify user-defined data parameters as part of an off-line batch job execution. For example, an IDE may, as part of an overnight batch job, scan all existing user-provided computer programs, e.g., stored under a particular file directory, to identify user-defined data parameters within and try to identify matching relationship among the identified data parameters. The method 300 may therefore include: parsing (302) first programming statements in accordance with a first programming syntax to identify the first one or more data parameters; and parsing (304) second programming statements in accordance with a second programming syntax to identify the second one or more data parameters.

In other implementations, an on-demand code parsing features is provided. For example, when a user is requesting a spell check of 100 lines of SQL programming statements, the computing system 106 may, as part of the user-requested spell check, parse the 100 lines of SQL programming statements to identify parameters that have not been determined as having no matching parameter in a frontend JAVA program (e.g., which queries at least one common data table against which the SQL programming statements also query). The computing system 106 may identify any matching JAVA parameters and present the matching relationship to the user, so that the user can either confirm and have such a mapping stored in the parameter database 156 for future reference or disapprove proposed matching relationship and have the user feedback taken into account for the purpose of identifying future matching parameter. For example, a user, after disapproving a system-proposed matching relationship (e.g., the JAVA parameter "CA_sales' matches the SQL parameter "Canada_sales"), may provide a parameter-matching rule that the phrase "CA" should not be matched to "Canada," but to "California" or "Cali." The computing system 106 may take this newly-added rule into account when determining whether the JAVA parameter "CA_cost' matches the SQL parameter "Canada_cost" or "California_cost."

In some implementations, after pasting the programming statements, the method 300 may identify relevant data parameters based on the parsing. For example, after identifying the parsed-out keyword "SELECT," the computing system 106 may compare the keyword "SELECT" with a list of system-provided SQL keywords (which includes "SELECT," "DROP," "Table," and "SUM").

If a keyword matches a keyword listed on the list of system-provided SQL keywords, the computing system may determine that the keyword is a system-defined parameter, for which a matching user-provided parameter does not exist, and as such skips the matching steps.

If, however, a keyword does not match any keyword listed on the list of system-provided SQL keywords, the computing system may determine that the keyword is a user-provided parameter, for which a matching parameter needs to be searched. The method 300 may also include identifying (306) first one or more data parameters associated with a first data domain and identifying (308) second one or more data parameters associated with a second data domain.

In some implementations, after identifying the relevant parameters, the method 300 may begin the parameter matching process. One example parameter matching process may include matching a user-defined parameter with an intermediary parameter (e.g., used by the configuration interface 206). Then based on which one or more destination data parameters the intermediary parameter is mapped to, the computing system may determine how the user-defined parameter is matched to destination parameters. Using intermediary parameters is technical advantageous, as it does not require modifying the source code, which is not only error-prone but also sometimes infeasible (e.g., some software engineering team or practice does not allow changing the names of the existing data variables).

After one or more matching iterations are completed, the computing system 106 may identify, e.g., visually to a user, the parameter-matching relationship. The method 300 may therefore also include determining (310) that the first one or more data parameters corresponds to the second one or more data parameters.

The computing system 106 may store the matching relationship, e.g., in the parameter database 158, for future reference. Responsive to the determining, the method 300 may generate (312) a mapping that identifies the first one or more data parameters as corresponding to the second one or more data parameters.

A data parameter matching relationship may include one-to-one relationships, many-to-one relationships, and one-to-many relationships. The first one or more data parameters may therefore include two or more data parameters and the second one or more data parameters may therefore include a single data parameter.

The first programming statements include a programming statement written in a first programming language, and the second programming statements include a programming statement written in a second programming language different from the first programming language.

In some implementations, the computing device 106 may match data parameters identified from different types of programming statements. The first programming statements may therefore include a programming statement written in a first type of programming language, and the second programming statements may therefore include a programming statement written in a second type of programming language different from the first type of programming language. For example, the first programming statements include SQL programming statements (e.g., MS SQL statements or MY SQL statements) and the second programming statements include OOP statements (e.g., JAVA statements or C++ statements).

In some implementations, variable definitions may be used to identify matching data parameters. Determining that the first one or more data parameters correspond to the second one or more data parameters may therefore include: identifying a parameter definitional statement associated with the first one or more data parameters; identifying a second parameter definitional statement associated with second one or more data parameters; and determining that the first one or more data parameters corresponds to the second one or more data parameters based on the first parameter definitional statement and the second parameter definitional statement.

A variable's type information, in some implementations, may be used to identify matching parameters. For example, the computing system may determine that parameter A and parameter B do not match, because the parameter A represents an integer value, but the parameter B represents a character value. For another example, the computing system may determine that parameter A matches parameter B, because both the parameter A and the parameter B represent integer values. For a third example, the computing system may 106 determine that the parameter A and the parameter B do not match, because the parameter A represents a constant value, but the parameter B represents a variable value.

In some implementations, variable assignment statements may be used to identify matching data parameters. Determining that the first one or more data parameters corresponds to the second one or more data parameters, in some implementations, may include: identifying a parameter assignment statement associated with the first one or more data parameters; identifying a second assignment definitional statement associated with second one or more data parameters; and determining that the first one or more data parameters corresponds to the second one or more data parameters based on the first parameter assignment statement and the second parameter assignment statement.

For example, if parameter C equals the sum of the values of parameters A and B; while parameter D equals the lesser of the values of parameters A and B, the computing system may 106 determine that the parameter A and the parameter B do not match, because the parameter A represents a constant value, but the parameter B represents a variable value, the computing system may determine that the parameter C and the parameter D do not match, because their values are assigned in different ways (e.g., the sum of two values vs. the lesser of the two values).

For another example, if parameter C equals the sum of the values of parameters A and B; while parameter D equals twice the value of parameter A, the computing system may 106 determine that the parameter C and the parameter D do not match, because their values are derived from different variables.

For a third example, if parameter C equals a property of an object A in one class (e.g., the length of a car object in a vehicle class), while parameter D equals equal to a different property of an object B in a different class (e.g., the height of an elementary school student object in a human being class), the computing system may 106 determine that the parameter C and the parameter D do not match, because their values are derived from different objects belonging to different classes.

Another example method for matching data variables across different data domains, in some implementations, comprises: identifying a first data parameter included in a first programming statement; selecting a mapping file that includes one or more mappings between parameters associated with in a first type of programming language and parameters associated with in a second type of programming language; identifying, based on the one or more mappings, second one or more data parameters associated with a second programming statement; receiving a user selection of the first data parameter; and responsive to the user selection, presenting the second one or more data parameters to a user. The second type of programming language is different from the first type of programming language.

Identifying the second one or more data parameters may include identifying the second one or more data parameters based on a definitional statement associated with the first data parameter.

Identifying the second one or more data parameters may include identifying the second one or more data parameters based on an assignment statement associated with the second one or more data parameters.

The method may further include presenting the second one or more data parameters concurrently with the first data parameter to the user. The method may also include enabling the user to modify the one or more mappings.

The user section includes a predefined mouse movement associated with the first data parameter; and wherein presenting the second one or more data parameters comprises visually emphasizing the second one or more data parameters.

Figure 4:
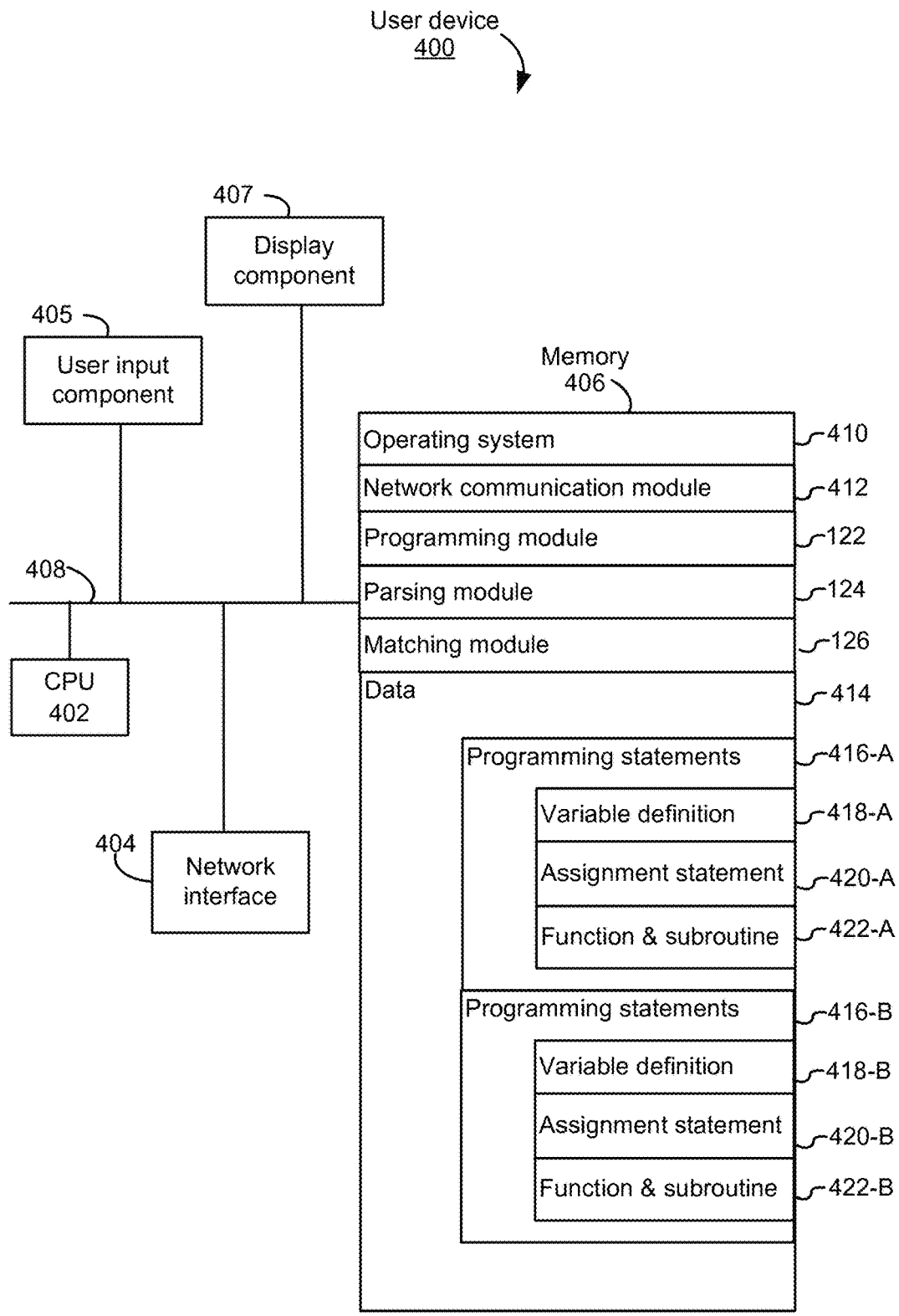
FIG. 4 is a schematic view illustrating an embodiment of a user device.

FIG. 4 is a schematic view illustrating an embodiment of a user device 400, which can be the device 102 shown in FIG. 1. The device 400 in some implementations includes one or more processing units CPU(s) 402 (also referred to as hardware processors), one or more network interfaces 404, a memory 406, and one or more communication buses 406 for interconnecting these components. The communication buses 406 optionally include circuitry (sometimes called a chip set) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

an operating system 410, which includes procedures for handling various basic system services and for performing hardware dependent tasks;

a network communication module (or instructions) 412 for connecting the device 400 with other devices (e.g. another device 400 or the computing system 106) via one or more network interfaces 404 (wired or wireless) or via the communication network 104 (FIG. 1);

a programming module 124 for enabling, e.g., via an IDE, a user to provide one or more programming statements, e.g., object oriented programming statements (e.g., JAVA and C++ statements), scripting programming statements (e.g., PERL statements, VBSCRIPT statements, and JAVA SCRIPT statements), SQL statements (e.g., MYSQL statements and MS SQL statements);

a parsing module 126 for parsing programming statements based on parsing rules, e.g., user-provided parsing rules or system-defined parsing rules;

a matching module 126 for matching parameters from different programming statements (e.g., statements A and B), different source code files (e.g., files A and B), different data domains (e.g., federal appellate jurisdictions and the names of the States in the United States), different programming languages (e.g., SQL and JAVA) in accordance with syntax-based matching rules, semantics-based matching rules, or both; and data 414 stored on the device 400, which may include:
a first set of programming statements 416A (e.g., 10 lines of VB SCRIPT source code), which may include:
one or more variable definitions (e.g., INT variable_A, which identifies the variable A as having the Integer type);
one or more assignment statements (e.g., A=C+B); and
one or more functions or subroutines (e.g., INT Cal_Addition (input 1, input 2, output_total, which identifies the function Cal_Addition as having two inputs and an output having an Integer type); and
a second set of programming statements 416B (e.g., 20 lines of C source code), which may include:
one or more variable definitions (e.g., char variable_B, which identifies the variable B as having the character type);
one or more assignment statements (e.g., JK=4B*7A); and
one or more functions or subroutines (e.g., number Cal_Multiple (input 1, input 2, output_total, which identifies the function Cal_Multiple as having two inputs and an output having a real number type).

The device 400 may also include a user input component 407 for enabling a user to interact with (e.g., providing input to) the device 400. In some implementations, the user input component 407 may be a keyboard, a mouse, a touchpad, a track pad, or a touch screen. The device 400 may further include a display component 407 for presenting information, e.g., source code, programming statement, or any other information in an IDE, to a user.

In some implementations, one or more of the above identified elements are stored in one or more of the previously mentioned memory devices, and correspond to a set of instructions for performing functions described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
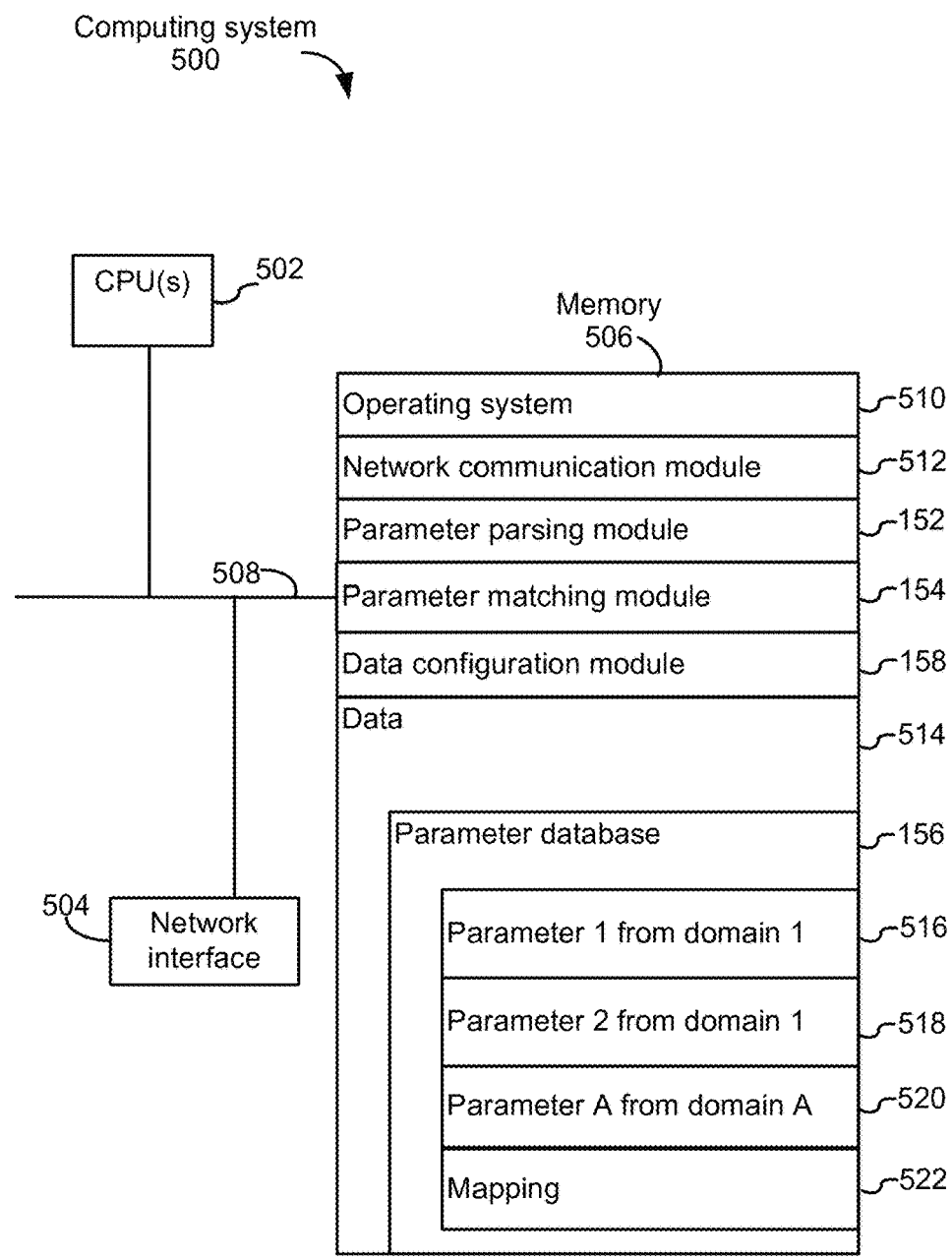
FIG. 5 is a schematic view illustrating an embodiment of a computing system.

FIG. 5 is a schematic view illustrating an embodiment of a computing system 500, which can be the computing system 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

an operating system 510, which includes procedures for handling various basic system services and for performing hardware dependent tasks;

a network communication module (or instructions) 512 for connecting the system 500 with other devices (e.g., the user devices 102 and 102B) via one or more network interfaces 504;

the parameter parsing module 152 for parsing programming statements, source code files, data sources, or a combination thereof and identifies, based on one or more parsing rules, data parameters;

the parameter matching module 154 for matching data parameters recognized from different programming languages or data domains with other each when certain conditional are met;

the data configuration module 158 for query the parameters and parameter mappings stored in the parameter database 156 and presents a mapping relationship, when exists, between two parameters; and data 514 stored on the system 500, which may include:
the parameter database 156 for storing parameters recognized from different programming languages or data domains, as well as the mapping relationships between these stored parameters, which may include:
parameters 1 and 2 (516 and 518) recognized from data domain 1;

a parameter A (520) recognized from data domain A; and a mapping relationship 522 representing the relationship between the (1) parameters 516 and 518 and (2) the parameter A; for example, the total values of the parameters 516 and 518 correspond to the value of the parameter A.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Although FIGS. 4 and 5 show a "user device 400" and a "computing system 500" and respectively, FIGS. 4 and 5 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to execute instructions from the non-transitory memory to cause the system to perform operations comprising:
identifying one or more first function input parameter names in a first programming language function definition statement in a first programming language;
identifying one or more second function input parameter names in a second programming language function definition statement in a second programming language;
determining that the one or more first function input parameter names in the first programming language function definition statement correspond to the one or more second function input parameter names in the second programming language function definition statement;
responsive to the determining, generating a mapping file that identifies the one or more first function input parameter names as corresponding to the one or more second function input parameter names;
identifying a third function input parameter name associated with a third programming language function definition statement in the first programming language;
determining that the third input function parameter name corresponds to the one or more second function input parameter names in the second programming language function definition statement; and
regenerating the mapping file to identify the third input function parameter name as corresponding to the one or more second function input parameter names in response to the identifying the third function input parameter name.

2. The system of claim 1, wherein the operations further comprise:
receiving a fourth programming language function definition statement in the first programming language;
determining that a function input parameter name in the fourth programming language function definition statement corresponds to the one or more first function input parameter names in the mapping file; and
identifying, one or more function input parameter names in the second programming language that correspond to the third function input parameter name using the mapping between the one or more first function input parameter names and the one or more second function input parameter names in the mapping file.

3. The system of claim 1, wherein the operations further comprise:
parsing the first programming language function definition statement based on a first programming syntax to identify the one or more first function input parameter names; and
parsing the second programming language function definition statement based on a second programming syntax to identify the one or more second function input parameter names.

4. The system of claim 3, wherein the first programming language function definition statement is written in a first type of programming language, and the second programming language function definition statement is written in a second type of programming language different from the first type of programming language.

5. The system of claim 4, wherein the first programming language function definition statement includes one or more structured query language (SQL) programming statements and the second programming language function definition statement includes one or more object oriented programming (OOP) statements.

6. The system of claim 1, wherein determining that the one or more first function input parameter names corresponds to the one or more second function input parameter names comprises:
   identifying a first parameter assignment statement associated with the one or more first function input parameter names;
   identifying a second parameter assignment statement associated with the one or more second function input parameter names; and
   determining that the one or more first function input parameter names corresponds to the one or more second function input parameter names based on the first parameter assignment statement and the second parameter assignment statement.

7. The system of claim 1, wherein generating the mapping file further comprises:
   mapping the one or more first function input parameter names to an intermediary parameter; and
   mapping the intermediary parameter to the one or more second function input parameter names.

8. The system of claim 1, wherein determining that the one or more first function input parameter names correspond to the one or more second function input parameter names comprises:
   identifying a first key word in the one or more first function input parameter names;
   identifying a second key word in the one or more second function input parameter names; and
   determining that the first key word matches the second key word.

9. The system of claim 1, wherein determining that the one or more first function input parameter names corresponds to the one or more second function input parameter names comprises:
   identifying a rule that corresponds to the one or more first function input parameter names; and
   determining, using the rule, that the one or more first function input parameter names correspond to the one or more second function input parameter names.

10. A method, comprising:
    monitoring changes in a first function input parameter name included in a first programming language function definition statement received from a graphical user interface, wherein the first function input parameter name is in a first type of programming language;
    selecting a mapping file that includes one or more mappings between function input parameter names associated with the first type of programming language and function input parameter names associated with a second type of programming language, wherein the second type of programming language is different from the first type of programming language;
    automatically identifying using the one or more mappings, one or more second function input parameter names associated with a second programming language function definition statement that map to changes in the first function input parameter name as the changes to the first function input parameter names are monitored;
    automatically monitoring changes in a third function input parameter name included in a third programming language function definition statement received from the graphical user interface, wherein the third function input parameter name is in the first type of programming language;
    automatically identifying, using the one or more mappings, the one or more second function input parameter names associated with the second programming language function definition statement that map to changes in the third function input parameter name as the changes to the third function input parameter name are monitored; and
    presenting the one or more second function input parameter names to a user via the graphical user interface.

11. The method of claim 10, wherein the first programming language function definition statement includes a structured query language (SQL) programming statement and the second programming language function definition statement includes an object oriented programming (OOP) statement.

12. The method of claim 10, wherein identifying the one or more second function input parameter names is based on an assignment statement associated with the one or more second function input parameter names.

13. The method of claim 10, wherein the first programming language function definition statement includes a scripting programming statement and the second programming language function definition statement includes an OOP statement.

14. The method of claim 10, wherein the first programming language function definition statement includes a scripting programming statement and the second programming language function definition statement includes an SQL statement.

15. The method of claim 10, further comprising:
    presenting the one or more second function input parameter names concurrently with the first function input parameter name via the graphical user interface; and
    selecting one of the one or more second function input parameter names.

16. A non-transitory machine-readable medium having stored thereon machine-readable instructions executable to cause a machine to perform operations comprising:
    receiving changes to a first function input parameter name included in a first programming language definition statement from a graphical user interface, wherein the first function input parameter name is in a first type of programming language;
    selecting a mapping file that includes one or more mappings between function input parameter names associated with the first type of programming language and function input parameter names associated with a second type of programming language, wherein the second type of programming language is different from the first type of programming language;
    automatically identifying, using the one or more mappings, one or more second function input parameter names associated with a second programming language function definition statement that map to the changes in the first function input parameter name as the changes to the first function input parameter name are received;
    receiving changes in a third function input parameter name included in a third programming language function definition statement received from the graphical user interface, wherein the third function input parameter name is in the first type of programming language;
    automatically identifying, using the one or more mappings, the one or more second function input parameter names associated with the second programming language function definition statement that map to changes in the third function input parameter name as the changes to the third function input parameter name are received; and presenting the one or more second function input parameter names to a user via the graphical user interface.

17. The non-transitory machine-readable medium of claim 16, wherein the operations are executed in a software debugging application.

18. The non-transitory machine-readable medium of claim 16, wherein the operations further comprise:

presenting the one or more second function input parameter names concurrently with the first function input parameter name to the user.

19. The non-transitory machine-readable medium of claim 16, wherein the operations further comprise:

enabling the user to modify the one or more mappings.

20. The non-transitory machine-readable medium of claim 16, wherein user section includes a predefined mouse movement associated with the first function input parameter name; and wherein presenting the one or more second function input parameter names comprises visually emphasizing the one or more second function input parameter names.

* * * * *